United States Patent [19]

Grandmougin

[11] Patent Number: 5,249,043
[45] Date of Patent: Sep. 28, 1993

[54] DEVICE FOR DISPATCHING VIDEO AND/OR AUDIO SIGNALS BETWEEN SEVERAL RECEIVERS

[75] Inventor: Gérard Grandmougin, Strasbourg, France

[73] Assignee: Compagnie Generale de Videotechnique (C.G.V.), Strasbourg, France

[21] Appl. No.: 735,295

[22] Filed: Jul. 24, 1991

[30] Foreign Application Priority Data

Jul. 30, 1990 [FR] France .................. 9009684

[51] Int. Cl.$^5$ .................. H04N 7/10; H04H 1/02
[52] U.S. Cl. .................. 358/86; 455/3.2; 455/6.3
[58] Field of Search .................. 358/86, 84, 93, 85; 455/3.1, 3.2, 3.3, 4.1, 4.2, 6.1, 6.2, 6.3, 12.1; 340/825.24; 359/143, 144, 148

[56] References Cited

U.S. PATENT DOCUMENTS

| | | | |
|---|---|---|---|
| 2,974,188 | 3/1961 | Diambra | 358/85 |
| 4,077,006 | 2/1978 | Nicholson | 455/5.1 |
| 4,337,480 | 6/1982 | Bourassin | 358/93 |
| 4,740,834 | 4/1988 | Mobarry | 455/3.2 |
| 4,787,085 | 11/1988 | Suto et al. | 455/6.1 |
| 4,864,632 | 9/1989 | Moriyama et al. | 455/3.1 |
| 4,866,787 | 9/1989 | Olsen | 455/3.2 |
| 4,935,924 | 6/1990 | Baxter | 455/6.1 |
| 5,027,426 | 6/1991 | Chiocca, Jr. | 455/6.1 |
| 5,073,930 | 12/1991 | Green et al. | 455/3.2 |

Primary Examiner—Reinhard J. Eisenzopf
Assistant Examiner—Lisa Charouel
Attorney, Agent, or Firm—Roland Plottel

[57] ABSTRACT

Device for dispatching video and/or audio signals to several receivers. A typical installation has a main television receiver (1), optically coupled to a video recorder (2), and a standard antenna (4) for video and/or audio signal reception. A distributor (5) transmits these signals to the main receiver and to at least one auxiliary television receiver (7), and is coupled to at least one additional source (912) of baseband video and/or audio signals, which is independent of the reception antenna. The device has a dispatcher unit (14) which receives the antenna signals and transmits them to the main receiver directly, or through the video recorder, and receives the baseband video and/or audio signals from the independent source. A bypass unit (15) is mounted on a coaxial connection cable (6) between the antenna and the dispatcher unit in order to both avoid return signal towards the antenna of the signals received from this dispatcher unit, and also to allow their transmission towards the auxiliary receiver through an additional coaxial cable (9). An incoming unit (16) receives signals from the dispatcher unit through the bypass unit and transmits them to the auxiliary receiver.

7 Claims, 3 Drawing Sheets

DEVICE FOR DISPATCHING VIDEO AND/OR AUDIO SIGNALS BETWEEN SEVERAL RECEIVERS

The present invention relates to a device for dispatching video and/or audio signals, coming from separate sources, towards several distinct receivers distributed, in particular, within the rooms of a domestic dwelling or among appliances located in the same enclosed space but disposed at different places inside this enclosed space.

The invention aims in particular to ensure the transfer of the signals through the already existing means of connection between the customary receiving antenna serving the relevant dwelling and the various viewing appliances, consisting of distributor units and coaxial cables, whilst avoiding modification of the cabling already in place.

It is known that, more and more frequently, each domestic dwelling contains several television receiving appliances, distributed within various rooms (lounge, bedroom, various locations etc.) of this dwelling. Furthermore, there is presently a proliferation in the number of video appliances or of sources of images of various types available to each user, such as video recorders, receivers of satellite-relay emissions, selectors for cable network subscribers, decoders for coded programs, video discs, video cameras, etc.

In these circumstances, it can be imagined that it is particularly attractive to be able to dispatch the images thus available and received in one of the rooms of the dwelling, in order to transmit them in any desired manner to the various receivers situated in other rooms of this dwelling, starting from any one of these receivers, whilst allowing them to be selected on demand and to be dispatched in accordance with all the desired combinations.

In particular, the invention makes it possible to dispatch towards the various abovementioned receivers, in addition to the signals coming from a conventional receiving antenna, other video and/or audio signals available within a given room of the dwelling, for example on a receiver of satellite-relay emissions, or even coming from other sources such as for example an optical disc reader, the dispatching of these signals being carried out without significantly altering their quality, using directly the coaxial cables already in place, and at the same time makes it possible to cause remote control signals and/or the appropriate switching orders to travel in the opposite direction by these means of connection.

Systems are already known in the art which allow various sources of video and/or audio signals to be switched towards several distinct apparatuses, such systems moreover being able to convey other signals, in particular for remote control from an emitter of infrared radiation. Similarly, constructions are already known in which the network for dispatching the signals gathered by a reception antenna is used to construct additional video and/or audio connections. However, in these constructions, there is provision for these signals to be modulated prior to their transmission by the network, if necessary using a conversion circuit at the installation front-end.

EP-A-0,326,205 illustrates a construction of this kind in which signals coming from distinct video sources are modulated prior to being transmitted by an additional coaxial cable towards a dispatching head where they mix with those which come from the reception antenna, the system comprising a monitoring circuit which, within an authorized interval, seeks one or more free frequencies and controls as a function of the latter the modulating of the signals to be transmitted.

An analogous system has been described in an article from the 151th international television colloquium which took place at Montreux from the 11th to the 17th Jun. 1987 (see the report *BROADCAST AND CATV* —pages 165, 173—J. HOFMANN "*Cable, television, and the consumer electronic bus*"). However, there again the system uses two coaxial cables for the outward and inward journeys respectively of the video signals, which are previously modulated, the lowest frequencies being used to transmit the additional remote control signals.

However, in these known constructions, the additional signals dispatched by being superimposed with the high-frequency signals coming from the antenna are never in baseband mode, which makes it impossible to exploit them directly on a receiver situated at a distance in another room of the dwelling, but on the contrary require successive modulating and demodulating steps which entail a lowering of the quality of the signals and also entail a certain complication in the necessary circuits.

The present invention allows these disadvantages to be avoided by making it possible to dispatch on the coaxial cables which usually receive the high-frequency signals coming from a conventional reception antenna, baseband video signals, if necessary audio signals possibly frequency-modulated, switching signals coming from infrared remote control units, and a voltage for powering various circuits, all these signals occupying the lowest frequencies, and consequently not interfering with the high-frequency signals received from the antenna and without there being any risk of the degrading of these signals.

To this end, the relevant device, intended to be mounted in an installation comprising a main television receiver, possibly coupled to a video recorder, an antenna for video and/or audio signal reception combined with a distributor for transmitting these signals to the main receiver if necessary via the video recorder by way of a coaxial connection cable and towards at least one auxiliary television receiver, locally separated from the main receiver, and at least one additional source of baseband video signals and/or audio signals, which is coming from sources independent of the reception antenna, is characterised in that it comprises a dispatcher unit receiving the antenna signals in order to transmit them to the main receiver directly or through the video recorder as well as the baseband video and/or audio signals received from the independent sources, a bypass unit mounted on the coaxial connection cable between the antenna and the dispatcher unit in order to avoid the return towards the antenna of the signals received from this dispatcher unit and, on the other hand, to allow their transmission towards the auxiliary receiver through an additional coaxial cable and an incoming unit, the latter receiving the signals from the dispatcher unit through the bypass unit in order to transmit them to the auxiliary receiver.

The device thus makes it possible to use the coaxial cable necessarily existing between the reception antenna with which the relevant dwelling is provided, and the main receiver, possibly through the video recorder, so as to return towards the auxiliary receiver the signals received by the latter, as well as additional sources attached to the dispatcher unit.

A necessary, the additional sources may consist of a reception installation, comprising a special antenna for receiving satellite-relay emissions, and a receiver box delivering a baseband video signal, an optical disc or laser disc reader, a unit for connecting with or for selecting a cable network, a video camera, another video recorder etc.

According to a particular characteristic of the relevant device, the dispatcher unit on the one hand, and the incoming unit on the other hand, comprise respectively receives of infrared waves, able to receive control signals coming from an appropriate remote control disposed in the vicinity of the incoming unit in order to control the additional sources connected to the dispatcher unit.

According to another characteristic of the invention, the dispatcher, bypass and incoming units each comprise an input/output switching filter containing a central channel connected, on the one hand, to the high frequency channel (HF) by way of a high-pass filter, and to the low frequency channel (LF) by way of a low-pass filter.

In a preferred embodiment of the invention, the transmitter unit comprises, ahead of the switching filter, two switches having at least two positions, one of these switches enabling the main receiver to select, in addition to the signals received from the antenna, one of the additional sources, the other switch being provided in order to direct the signals emanating from one of these additional sources towards a processing circuit which frequency-modulates the audio signals and adds them to the video signals, the resulting signals being transmitted through the switching filter towards the incoming unit, via the bypass unit.

In the same embodiment, the bypass unit comprises three filters, two of which are high-pass filters mounted in parallel and attached to the outputs of the antenna dispatcher, towards the main receiver and the auxiliary receiver respectively, these two filters being joined in series by a low-pass filter, so that the frequency-modulated audio and/or baseband video signals returned towards the bypass unit by the dispatcher unit through the coaxial connection cable are not able to reach the distributor, but are diverted towards the incoming unit through the low-pass filter.

Finally, and still in the same embodiment, the incoming unit comprises, behind the switching filter, a circuit for separating the audio and video signals, and for demodulating the audio signals, the output of which is joined to the auxiliary receiver.

Other characteristics of a device for dispatching video and/or audio signals between several receivers will further emerge through the following description of an embodiment given by way of illustrative and non-limiting example with reference to the attached drawings in which.

Figure 1:
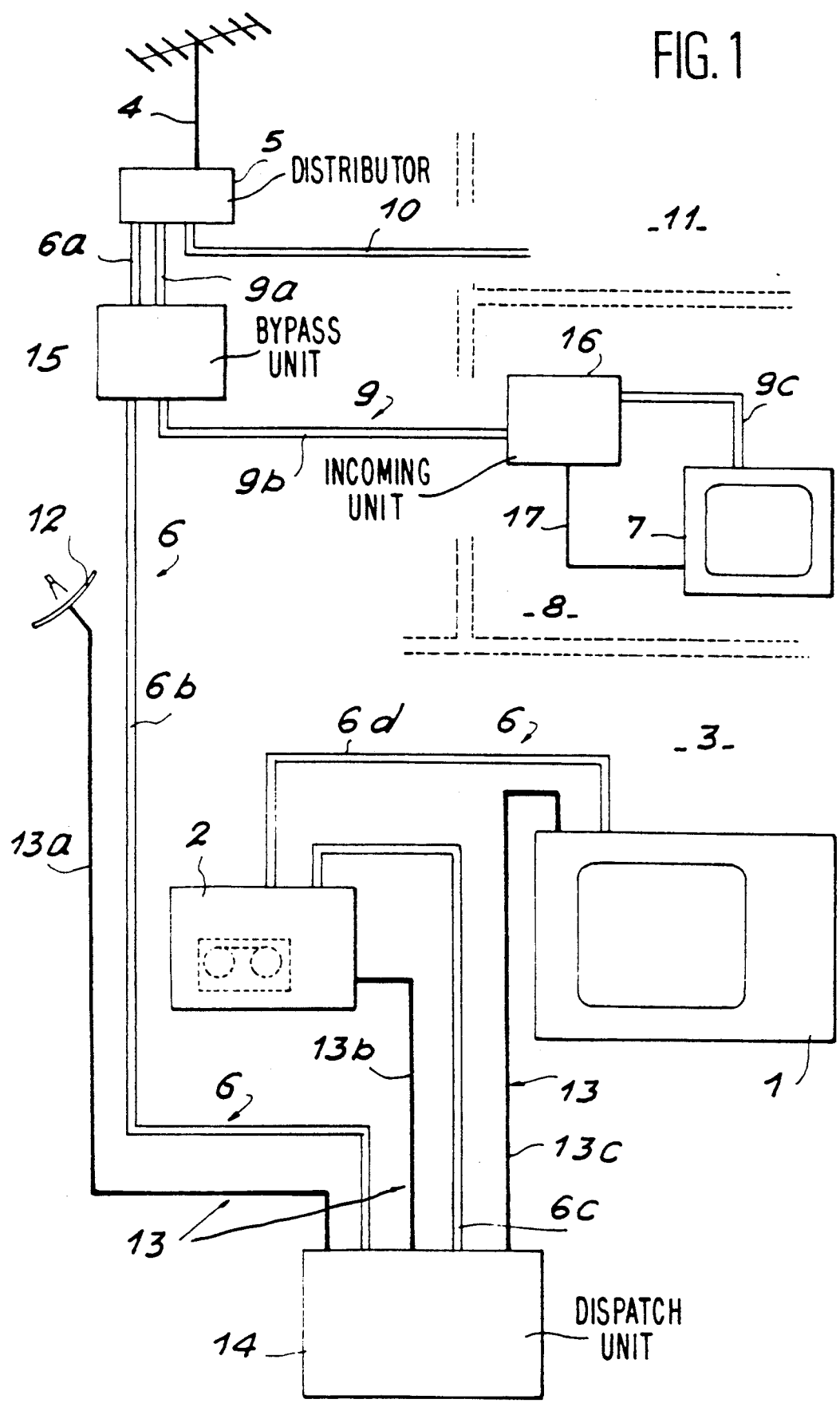
FIG. 1 is a general configurational diagram of an installation employing the device according to the invention.

In FIG. 1, reference 1 designates a main television receiver of a kind known per se, preferably combined with a video recorder 2. The whole is situated in a room or any location of a domestic dwelling or the like provided, in a manner in itself conventional, with a reception antenna 4 fixed to the roof of this dwelling receiving video and/or audio signals in the VHF or UHF bands. The antenna 4 is coupled to a distributor unit 5 allowing parallel dispatching of the high-frequency signals received, in particular towards the main receiver 1 by way of a coaxial cable 6 and also towards an auxiliary television receiver 7 disposed in a room 8 separate from the room 3 containing the main receiver, by means of another coaxial cable 9. A third coaxial cable 10 has been shown in the drawing, connected to the distributor 5 and able once again to transmit the same high-frequency signals to another auxiliary receiver (this time not shown in the drawing) situated in a third room 11 of the dwelling, distinct from the preceding rooms 3 and 8.

Commonly, the installation thus constructed can be attached to one (or more) additional source(s) furnishing baseband video images, or even audio signals accompanying the video signals, such a source being diagrammatically shown in FIG. 1 by the reference 12, illustrating an adjoining installation, comprising a special antenna for receiving satellite-relay emissions, coupled in a known manner to a receiver box, delivering a baseband video signal. Of course, other signal sources of this kind could be envisaged in place of or in addition to the source 12, such as an optical disc reader, video camera, additional video recorder, unit for selecting images coming from a cable network, etc. The corresponding signals are transmitted by an appropriate electrical connection 13, respectively to the dispatcher unit 14 whose role and structure will be defined further on, this connection then linking the latter to the video recorder and also to the main receiver. Advantageously, the connection 13 is constructed in the form of multiple cables, which are capable of conveying at least one video signal and one, or even two audio signals, and possibly a switching signal.

In accordance with the invention, the installation thus constructed aims to transmit the video and/or audio signals coming from the auxiliary source 12 or from the video recorder 2 towards the auxiliary receiver 7, using in particular the already existing coaxial connection cables, in particular the cables 6 and 9 attaching the various parts of the installation to the antenna distributor 5, and this without disturbing reception of the high-frequency signals coming from this installation and circulating on these cables in the opposite direction to the preceding signals.

To this end, the installation comprises a dispatcher unit 14 mounted in the room 3 in the vicinity of the main receiver 1 and of the video recorder 2, a bypass unit 15 avoiding the return towards the distributor 5 of the signals coming from the transmitter unit 14 and returning them towards the auxiliary receiver 7, and finally an incoming unit 16, mounted between this auxiliary receiver and the unit 15. The coaxial cables 6 and 9 subdivide into portions 6a, 6b, 6c and 6d respectively, between in succession the distributor 5, the coupler-separator 15, the dispatcher unit 14 the video recorder 2 and the main receiver 1 on the one hand, and 9a, 9b and 9c between the distributor 5, the bypass unit 15, the incoming unit 16 and finally the auxiliary receiver 7. An additional filar connection 17 is also provided between the receiver unit 16 and the auxiliary television 7 for the routing to the latter of the baseband signals and/or the audio signals received from the source 12. Similarly, the connection 13 between the source 12 and the main receiver 1 then the video recorder 2, subdivides, via the dispatcher unit 14, into sections 13a on the one hand, 13b and 13c on the other hand, as shown in the drawing.

Figure 2:
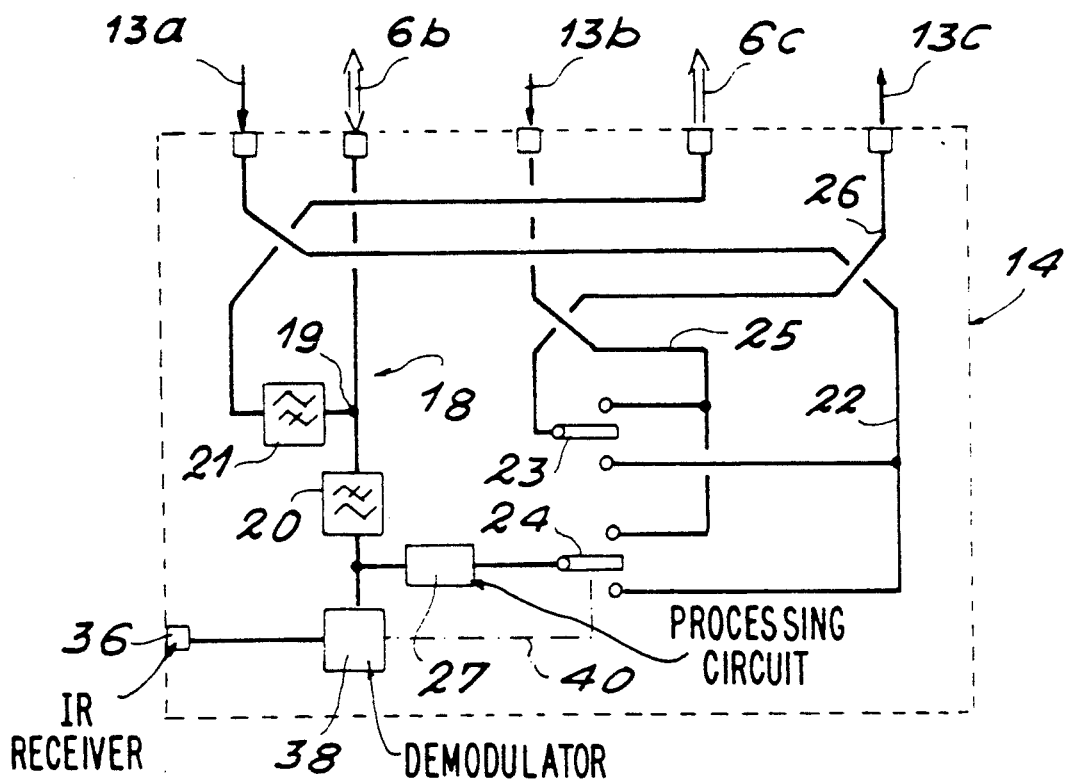
FIGS. 2, 3 and 4 are diagrammatic views illustrating the general structure of the dispatcher, bypass and incoming units involved in the relevant device.

FIG. 2 illustrates in more detail the structure of the dispatcher unit 14 to which are attached the coaxial cable parts 6b and 6c on the one hand, and the wire connections 13a, 13b and 13c on the other hand. This unit comprises a switching filter 18 with a central channel 19 attached to the coaxial cable 6b and to two filters 20 and 21 respectively, of which one 20 is a low-pass filter, and of which the other 21 is a high-pass filter, the cutoff of these filters being such that the first lets through only baseband video signals or frequency-modulated audio signals, and if necessary infrared remote control signals whose frequency is at most equal to 10 or 11 MHz, whereas the second for its part lets through only high-frequency signals of frequency lying between 40 and 900 MHz.

The connection wire 13a attaching the dispatcher unit 14 to the auxiliary source 12 contains inside this unit a connector 22 with two switches 23 and 24, having independent positions, whose mobile contacts can occupy one or other of two or more positions, these switches being combined with connections, 25 and 26 respectively.

When the switch 23 is in its high position, the main receiver 1 receives, by the connections 13c and 26, then 25 and 13b, the audio and video signals emanating from the video recorder 2. Conversely, when the switch 23 is in its low position, the main receiver receives, by the connections 13c and 26, then 22 and 13a, the audio and video signals emanating from an additional source, for example those which come from the installation for receiving a satellite-relay emission, constituting the source 12. Similarly, when the switch 24 is in its high position, the audio and video signals coming from the video recorder 2 are sent to a processing circuit 27 through the connections 25 and 13b; in its low position, this same circuit 27 receives the audio and video signals emanating from the antenna 12 through the connections 22 and 13a. In this circuit 27, the audio signals are frequency-modulated and added to the baseband video signals.

The resulting signal produced crosses the filter 20 but is stopped by the filter 21 so that it is returned by the coaxial cable 6b towards the bypass unit 15. This signal, whose frequency lies between 20 Hz and 6 MHz, at all events less than 20 MHz, cannot therefore, on the coaxial cable 6b, interfere with and disturb the antenna signals circulating on this cable in the opposite direction, towards the dispatcher unit 14.

Figure 3:
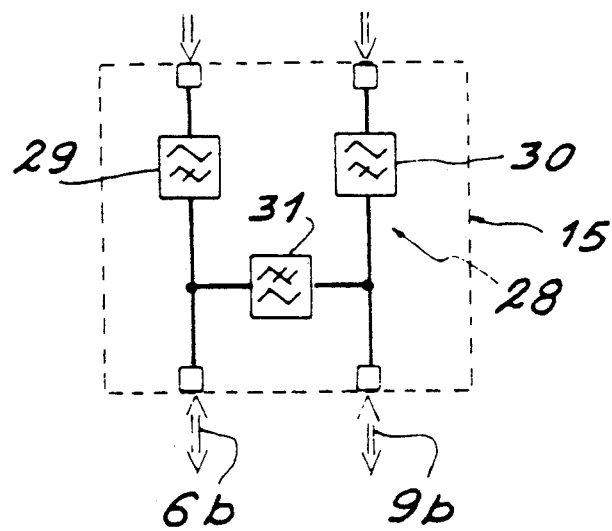

In the bypass unit 15 illustrated in FIG. 3, the preceding signals arrive at the switching filter 28, in which two high-pass filters 29 and 30 respectively prohibit the return towards the antenna of the signals produced, in particular on the coaxial cable sections 6a and 6b. On the other hand, after crossing from a low-pass filter 31 into the switching filter 28, the video and audio signals can readily be transmitted over the cable part 9b towards the auxiliary receiver 7, their frequency of less than 20 MHz avoiding any interference with the high-frequency signals coming from the antenna by the cable 9a and also transmitted towards the receiver 7 by the cable 9b.

Figure 4:
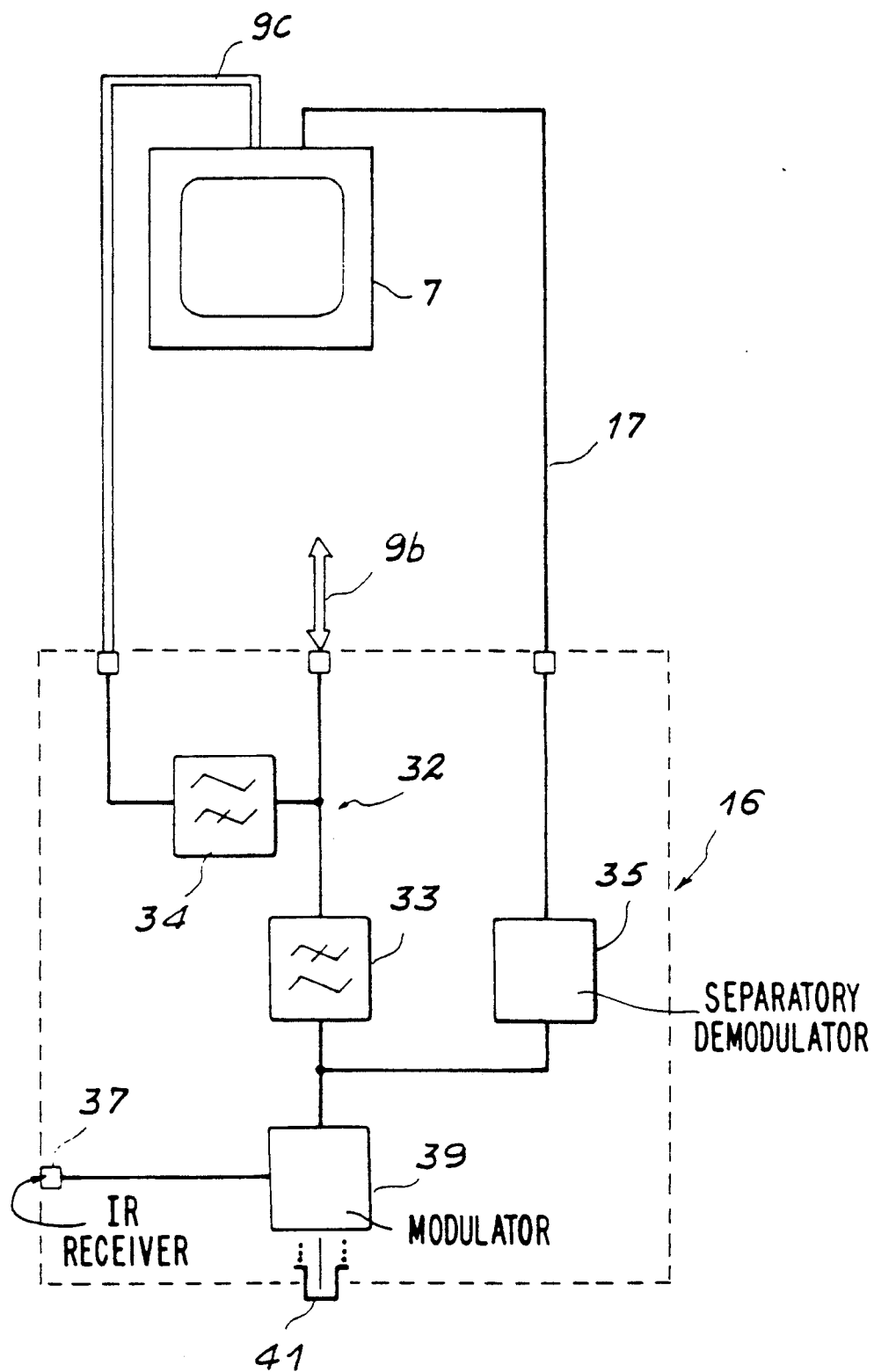

FIG. 4 illustrates the structure of the incoming unit 16 in which is again found, as in the dispatcher unit, a switching filter 32 with a low-pass filter 33 and a high-pass filter 34 respectively. The output of the latter is joined to the coaxial cable 9c and by the latter to the auxiliary receiver 7, whereas the output of the low-pass filter 33 is joined to the connection 17 by way of the circuit 35 for separating the video signal and the carrier (or carriers) of the audio signal (or signals), as well as for demodulating the latter.

In other words, the contact 23 of the breaker is preferably controlled locally by a button (not shown) situated on the front face of the dispatcher unit 14, and thus makes it possible to choose between the video signals coming either from the video recorder 2, or from the auxiliary source or installation 12, feeding the main receiver 1. The contact 24, controlled from a button 41 situated on the front face of the incoming unit 16, similarly acts to feed the auxiliary receiver 7, via the units 15 and 16.

The dispatcher 14 and incoming 16 units have respectively infrared receivers 36 and 37 allowing reception of remote control, orders from an appropriate unit or box (not shown). The signals emitted from the latter which go to receiver 37 and then are being modulated and demodulated in circuits 39 and 38 respectively. These circuits 38 and 39 also allow transmission to the switch 24 of the orders received at receiver 37 or alternatively following an action on button 41. Switch 24 is operated via a line 40 from circuit 38. Similarly, it is possible to transmit the signals for remote control of the video recorder 2 for example and/or to control the latter from the room in which the incoming unit 16 is disposed.

There is thus constructed a device for dispatching signals between several receivers of the same domestic installation, which uses the already installed coaxial cables, the switching filters used making it possible to avoid the return towards the receiving antenna of the signals coming either from the auxiliary source, or from the remote control box. The filters are worked out in such a manner as to ensure a suitable load impedance within the working frequency bands, the connection channels between the high-pass and low-pass filters in each switching filter consisting of coaxial cable elements. These filters moreover allow a limited, or even insignificant attenuation of the signals within the relevant frequency bands, whilst allowing the same signal/-noise ratio to be retained for the antenna signals, this avoiding the employing of an amplifier to eliminate snowy images. Finally, the proposed filters introduce a sizeable attenuation between the HF and LF channels in such a way as to prevent the baseband video signals, as well as the sub-carriers of the audio and remote control signals, from returning to the antenna, and radiating spurious signals of nuisance to the vicinity.

Of course, it is self-evident that the invention is not limited to the exemplary embodiment more especially described and shown above; on the contrary, it embraces all the variants.

I claim:

1. Device for dispatching signals between several receivers, which is intended to be mounted in an installation comprising a main television receiver (1), a standard antenna (4) for signal reception combined with a distributor (5) for transmitting an antenna signal to the main receiver by way of a coaxial connection cable (6) and towards at least one auxiliary television receiver (7), locally separated from the main receiver, and at least one additional source (12) of baseband signal, which is independent of the reception antenna, a dispatcher unit (14) receiving the antenna signal in order to transmit them to the main receiver as well as the additional baseband signal received from the additional source, a bypass unit (15) mounted on the coaxial connection cable between the antenna and the dispatcher unit in order to avoid the return, towards the antenna reflected signals from the dispatcher unit and, to allow transmission thereof towards the auxiliary receiver through an additional coaxial cable (9) and an incoming unit (16), the latter receiving the reflected signals from the dispatcher unit through the bypass unit in order to transmit them to the auxiliary receiver.

2. Device according to claim 1, characterised in that the additional source is selected from the group consisting of a special antenna for receiving satellite-relay emissions, an optical disc reader, a unit for connecting with or for selecting a cable network, a video camera, and a video recorder.

3. Device according to either of claims 1 or 2, characterised in that the dispatcher unit (14) and the incoming unit (16) comprise respectively a first receiver (36) and a second receiver (37) of infrared waves, able to receive control signals coming from a remote control disposed in the vicinity of the incoming unit in order to control the additional source (12).

4. Device according to any one of claims 1 or 2, characterised in that the dispatcher (14), bypass (15) and incoming (16) units each comprise an input/output switching filter (18, 28, 32) containing a central channel connected, to a high frequency channel (HF) by way of a high-pass filter, and to a low frequency channel (LF) by way of a low-pass filter.

5. Device according to claim 4, characterised in that the dispatcher unit (14) comprises, ahead of the switching filter (18), two switches (23, 24) having at least two positions, one of these switches (23) enabling the main receiver to select, in addition to the antenna signal received from the antenna (4), the baseband signal of the additional source (12), the other switch (24) being provided in order to direct the baseband signal emanating from the additional source towards a processing circuit (27) which frequency-modulates audio signals and adds them to video signals, the added signals being transmitted through the switching filter towards the incoming unit (16), via the bypass unit (15).

6. Device according to claim 4, characterized in that the bypass unit (15) comprises three filters (29, 30, 31), two of which (29, 30) are high-pass filters mounted in parallel and attached to outputs of the distributor (5), towards the main receiver (1) and the auxiliary receiver (7) respectively, these two filters being jointed in series by the low-pass filter (31), so that a frequency-modulated signal returned towards the bypass unit (15) by the dispatcher unit (14) through the coaxial connection cable (6) are not able to reach the distributor, but are diverted towards the incoming unit (16) through the low-pass filter.

7. Device according to claim 4, characterised in that the incoming unit (16) comprises, behind the switching filter (32), a circuit (35) for separating the reflected signal into audio and video signals, and for demodulating the audio signals, an output of which is joined to the auxiliary receiver (7).

* * * * *